Dec. 14, 1943.                F. B. EILERS                2,336,473
                        LIQUID DISPENSING APPARATUS
                          Filed April 15, 1939
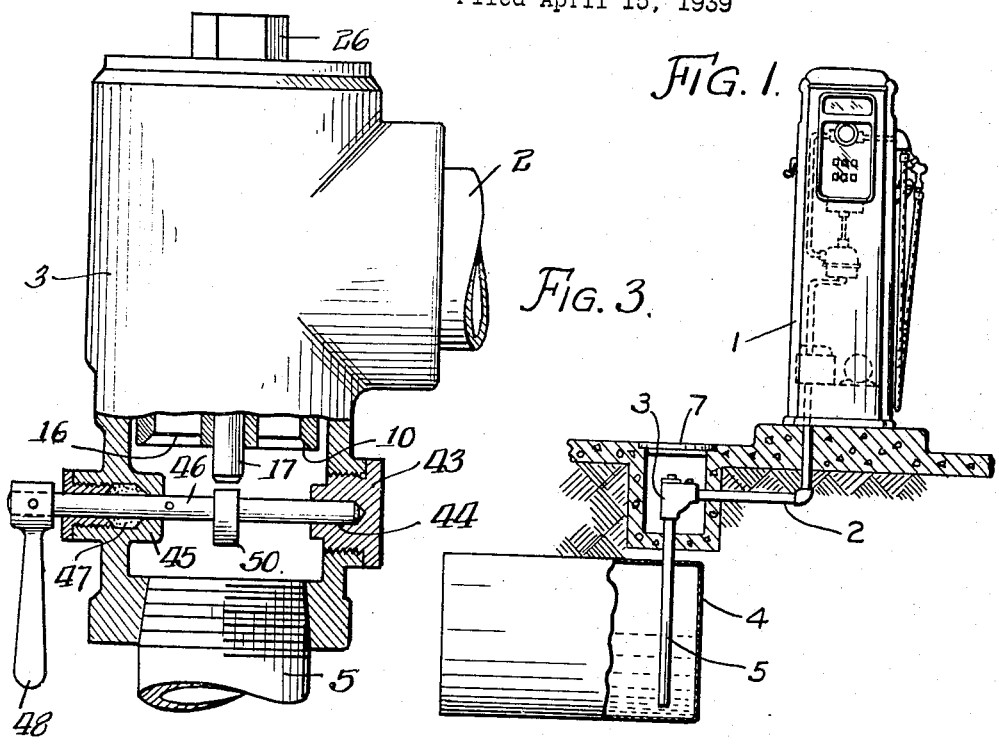
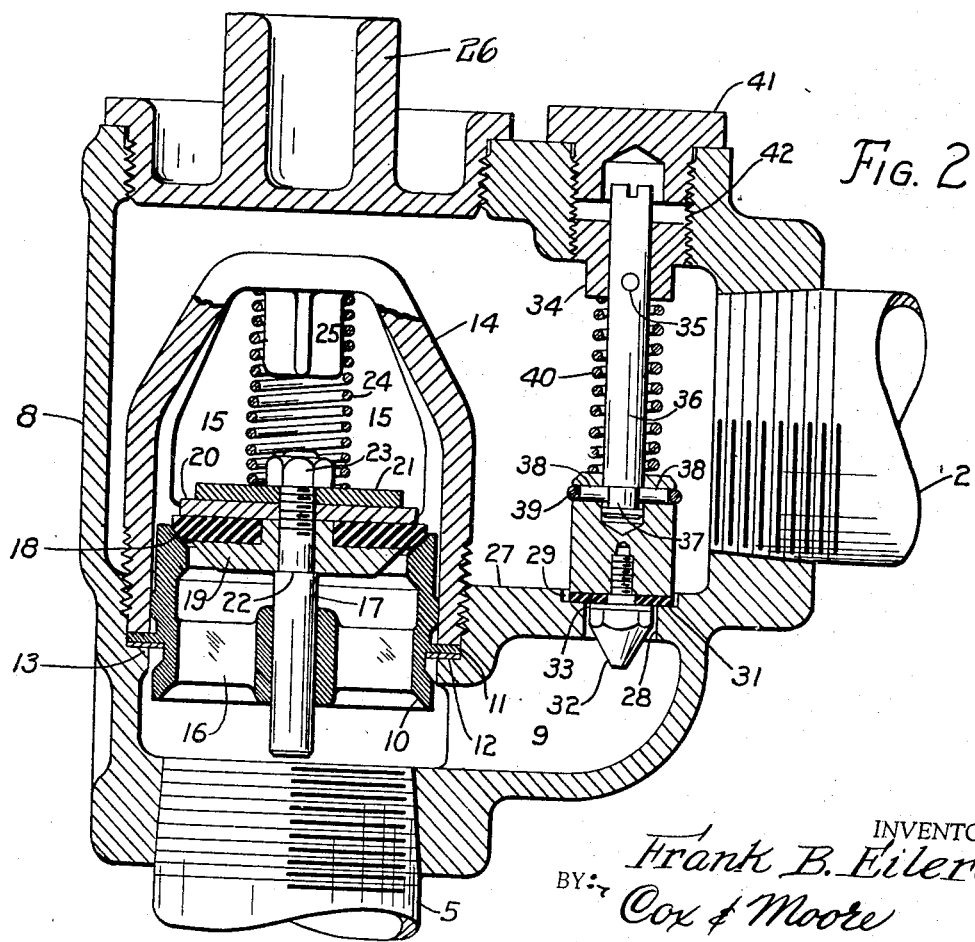
INVENTOR.
Frank B. Eilers
BY Cox & Moore
                    ATTORNEYS.

Patented Dec. 14, 1943

2,336,473

UNITED STATES PATENT OFFICE 2,336,473

LIQUID DISPENSING APPARATUS

Frank B. Eilers, Fort Wayne, Ind., assignor to Tokheim Oil Tank and Pump Company, Fort Wayne, Ind., a corporation of Indiana Application April 15, 1939, Serial No. 268,129

4 Claims. (Cl. 277—54)

This invention relates to liquid dispensing devices and more particularly to devices for dispensing petroleum products, such as fuel for internal combustion engines like gasoline, and particularly wherein the dispensing apparatus is of the service station equipment type.

The conventional service station equipment dispensing apparatus generally comprises an upstanding housing mounted on a concrete island, the housing enclosing a main portion of the dispensing apparatus, including piping forming the liquid dispensing line and which piping terminates exteriorly of the housing in a flexible hose provided at its end with a dispensing nozzle, preferably valve controlled. Within the housing the dispensing line has incorporated therein pumping means for causing the liquid to flow through the dispensing line, measuring means generally in the form of a liquid displacement meter, volume and/or price indicating means, which may include price computing means, a sight glass for indicating liquid flow, generally an air separator, and other attachments. At the bottom of the housing the dispensing line extends downwardly through the concrete island into the earth or foundation beneath the pump. This pipe continues downwardly several feet and its lower end extends into an underground reservoir adapted to hold a quantity of motor fuel such as gasoline and the like. In some instances the very bottommost portion of the dispensing line within the reservoir is provided with a check or line valve popularly known as a "foot valve" which opens in an upwardly direction to permit the gasoline to be drawn upwardly by means of the pump and forced through the flow line when the nozzle valves open but which automatically closes upon a cessation of the pumping operation and thereby holds the dispensing line full of liquid so as to keep the pump primed and to prevent the entrance of air into the dispensing line. In other types of installations this check valve, or line valve, instead of being installed at the very bottommost portion of the dispensing line within the reservoir itself, is located in the line exteriorly of the reservoir but still located in the ground or foundations below ground level. On numerous occasions these check valves or line valves become faulty in operation and it is necessary to remove and repair them. Heretofore, in prior installations, it was necessary to remove the entire section of pipe that carried the check valve and which pipe extended into the reservoir, and in addition it was necessary to disconnect this pipe from an upper section of pipe constituting the dispensing line. Furthermore, when it was desired to remove a check valve as constructed heretofore, it was necessary first to dismantle a portion of the line adjacent to the valve and since this portion of the line was maintained full of liquid, when the piping was disconnected or alternately when the piping was opened in any way to get at the valve, the liquid in the line above the valve would flow out, making the repair operation very inconvenient to the workman because of the flood of gasoline, and likewise presenting a fire hazard.

The present invention has for its objects a novel type of construction for a dispensing apparatus and particularly of the service station equipment type, for dispensing motor fuel like gasoline, wherein the check valve or line valve is installed in the line exteriorly of the underground gasoline reservoir, and specifically wherein the valve is installed in a well which is accessible from above ground and wherein particularly the object of the invention is to provide a line valve construction in which the valve may be bodily removed for repair or replacement without in any way disturbing the pipe connection forming the lower portion of the dispensing line; to provide a line valve or check valve construction for a dispensing apparatus and particularly of the service station equipment pump type for dispensing gasoline or the like, wherein the check valve or line valve is located exteriorly of the underground reservoir and accessible at ground level, wherein means is provided, in association with the dispensing line and in association with such check valve, for by-passing at will the liquid in the line above the check valve so as to permit liquid to flow into the tank without disturbing or opening the check valve; to provide a check valve or line valve construction for the dispensing flow line of a service station equipment pump for dispensing gasoline and the like, wherein means is provided, in association with the check valve located exteriorly of the underground gasoline reservoir, and providing manually operable means accessible from the ground level, for draining the upper portion of the dispensing line above the check valve back into and/or to fill the underground tank and without in any way disturbing the check valve in its closed position; to provide a fitting or attachment adapted to be inserted in the dispensing line and accessible at ground level and exteriorly of the underground motor fuel reservoir, providing a housing for the check valve or line valve which will permit the quick and ready removal of the check valve from the dispensing line without disturbing the dispensing line piping connected to said housing, and wherein said housing likewise is provided with an additional manually operable valve accessible likewise from ground level, adapted to be opened at will and providing means whereby the liquid in the dispensing line above the closed check valve may be drained downwardly into the reservoir so as to permit the subsequent opening of the housing and removal of the check valve for repair or replacement and/or to fill the reservoir; to provide in combination with the check valve or line valve of the dispensing line of a service station pump or liquid dispensing apparatus, an auxiliary manually operable valve adapted to drain that portion of the dispensing line which is above the closed check valve; to provide, in association with such auxiliary valve, an adjustment to take up wear on a flexible wearing surface of the valve while at the same time permitting of the opening and closing of the valve from a point outside of the housing and in a manner to prevent the possible escape of gasoline or other liquid from said housing to the atmosphere; to provide an improved type of angle check valve construction for the dispensing line of a service station equipment pump, wherein a fitting is provided at the junction of the vertical and angled pipes forming the lower portion of the flow line, which fitting is provided with a removable closure which, when removed, provides access to the check valve enabling easier removal of the check valve for repair or replacement and which housing is likewise provided with an auxiliary drain valve normally closed but operable in liquid-tight manner from the outside of the housing, whereby to drain liquid in the flow line above the closed check valve around the valve and back to the reservoir; to provide an installation of the foregoing type wherein means operable from outside of the valve is adapted to open the check valve itself to drain liquid located in the flow line above the valve and/or to fill the reservoir; to provide these and other objects of invention as will be apparent from a perusal of the following specification when taken in connection with the accompanying drawing:

Wherein Fig. 1 shows a conventional type of gasoline service station pump attached to its underground supply tank, certain parts being shown in section;

Wherein Fig. 2 is a section of the angle check valve showing the instant invention employed; and Fig. 3 is a modification showing another construction for draining the flow line above the check valve.

Referring now to the drawing in detail, Fig. 1 shows the conventional service station gasoline pump No. 1 as embodying the usual type of upstanding housing and adapted to enclose the main portion of the flow line formed of rigid metal pipes as is well known in the art. Those portions of the flow line composed by the housing comprise any type of motor driven pump for drawing liquid from the underground tank and forcing it through the flow line, any type of air separator, a liquid displacement meter, volume and/or price and/or computing mechanism actuated generally by the meter, a sight glass and other adjunctive devices if desired. The rigid pipe portion of the flow line terminates exteriorly of the housing and to it is connected a flexible hose having a terminal dispensing nozzle generally provided with a nozzle valve. The lower portion of the dispensing line within the housing extends downwardly exteriorly of the housing in the form of a pipe, as shown at 2 in Figure 1. The housing is generally mounted upon a concrete island as shown in the figure and this pipe extends downwardly through this concrete island into the ground. In some instances the underground tank is located directly under the pump and the pipe 2 extends downwardly a number of feet and has its lower end extending into the bottommost portion of the tank, where such bottommost portion is provided with a check valve opening upwardly and known as a "foot valve." In installations the lower portion of the dispensing line, known as the suction line, extends downwardly as at 2 (see Figure 1), is provided with an elbow fitting and an angularly extending pipe which extends laterally of and beneath the island where the pipe thence continues downwardly and enters the underground reservoir. Generally at the junction of the horizontal piping and the vertical piping entering the reservoir, an angular check valve is installed. These check valves serve to permit the upward flow of the liquid through the dispensing line under the action of the pump, but close at the termination of the dispensing operation, whereby to hold the dispensing line above the check valve full of liquid, whereby to keep the pump primed and whereby to maintain the pump full of liquid to the exclusion of air. The instant invention is particularly adapted to an installation of a dispensing pump incorporating an angle check valve in the suction line of the pump.

In the present installation I have provided the ground level to one side of the island and pump housing 1 with a concrete well or casing 6 and which houses angle check valve 3, and from this well the suction line extends downwardly and enters the underground supply tank 4 by means of the pipe 5. The check valve 3 is shown disposed in the well 6, which in turn is provided with a cover 7 for accessibility to the well.

Figure 2 illustrates the details of a valve body which comprises a housing or body portion 8 to which the dispensing line 2 is threadedly connected and an additional threaded outlet to which the dispensing pipe line 5 is threadedly connected, these two connections being preferably located at right angles. Within the fitting or housing 8, and directly above the inlet pipe 5, there is provided a chamber 9 having in its upper wall two openings adapted to receive the main line valve or check vale installation and an auxiliary drain valve hereinafter described. The larger opening is located directly above the inlet pipe 5 and is preferably provided with a shoulder and adjacent threads in which a conventional type of check valve may be located. In general, it comprises a cylindrical body 10 having an angular flange 11 which rests upon a gasket 12 and is together held upon a shoulder 13 of the body 8 by means of a threaded valve dome. This dome has openings in sides as at 15, normally from two to four ribs being provided as shown at 14. Web 16 extends across the cylinder 10 and is provided at its center with a bore or guide for the valve poppet stem 17. A valve sealing washer is provided for sealing against the angular seat 18 and this washer is held between supporting washers 19 and 20. Washer 19 has a central boss through which stem 17 extends and on the top of which washer 20 is clamped. These washers, together with the additional supporting washer 21, are securely held between a shoulder 22 of the stem 17 and a nut 23. A light compression spring 24 is disposed between dome 14 and the valve poppet to cause it to be more active in closing. The downwardly extending boss 25 on the dome serves as both a stop for the upward movement of the valve and also serves as means for locating the upper end of the spring 24.

The present invention resides in providing means associated with the check valve and the arrangement and location of the piping with relation to the underground tank, the ground or supporting surface of the pump and the dispensing line for draining back to the underground tank by means operable from the check valve housing and in the preferred form while same is closed, any liquid in the dispensing line above the check valve whereby, after such flow line thereabove is empty, the flow line at the check valve may be opened for repair or replacement of the check valve and without the hazard or inconvenience of having liquid overflow when the flow line is opened as heretofore. To this end the upper wall portion 27 of the main body 8 of the valve is provided with a smaller opening 28, hereinbefore mentioned, which in turn is provided with a counterbore 29 on its upper surface and which counterbore provides a seat for a drain valve and which bore 28 provides a liquid drain discharge port. The drain valve is preferably in the form of a disc valve 30 having a sealing disc 31, preferably made of some such material as cork or synthetic rubber, adaptable for the dispensing of gasoline or the like. This disc 31 is held to the valve body 30 by means of a conically shaped headed screw 32. In addition, a thin washer 33 is located between the screw head and the sealing disc 31, so that in tightening the screw the head may turn on the washer rather than injure the sealing surface. In the top of the body or casing 8 of the main valve and in axial alignment with the drain valve, there is provided a threaded valve actuator or adapter 34, which is secured by means of pin 35 to the stem 36 of the valve. The upper end of this stem extends above the adapter and is provided with any type of means for turning the valve to cause it to open or close on its seat due to the threaded connection of the plug or adapter 34 with the threaded opening of the body 8.

The lower end of the valve stem is preferably flat and has directly above it an annular recess or groove 37 and a hole is drilled transversely through the upper portion of the valve body 30 to receive two transversely disposed pins 38, which pins are adapted to engage the valve stem 36. These pins enter the relatively deep recess 37 whereby valve stem 36 is securely attached to the valve body 30 but in a manner to provide a relative movement between the valve stem and the valve body. A groove about the body 30 at its upper end encircles the ends of the pin 38 and this groove has disposed therein a snap ring 39 adapted to engage the outermost ends of the pins 38, whereby to hold them in place.

The recess 37 is considerably wider than the pins 38 and a spring 40 is compressed between the adapter 34 and the valve body 30. This construction permits the spring 40 to take up any variations caused by the compressing of the seal 31 over an extended period of use. In other words, it comprises an automatic adjustable means to take up wear on the yieldable valve disc 31.

Above the adapter 34 the casing 8 is provided with a threaded plug 41 which engages with threads 42 of the valve body. This plug 41 constitutes means to seal off the upper side of the adapter in the event any gasoline should possibly leak by the threads of the adapter 34; however, the threads of the adapter 34 constitute a seal-proof connection between the valve body 8 and the valve 30, while at the same time providing means for causing opening and closing movement of the valve when the valve is rotated. In the present instance, the upper end of the valve stem 36 is shown as provided with a slot for the insertion of a screw-driver or like instrument for opening and closing the valve.

In the construction shown, when the check valve needs to be repaired, the operator removes the plug 41 by the use of a screw-driver in the slot of the stem 36, the valve stem is rotated, which, by reason of its threaded connection with the threads 42, raises the valve from its seat, thereby permitting a liquid, such, for instance, as gasoline in the flow line above the closed check valve, to drain through the drain port 28 into the chamber 9, whence it is free to drain into the underground tank 5. When the draining operation has been completed the valve may again be closed on its seat by the threaded adapter and stem. Thereafter the main closure or cap 26 may be then unthreaded and removed from the valve fitting 8 and access is immediately had to the interior of the fitting for removing the main check valve for repair or attention. It will thus be seen with the construction of the angle check valve herein shown, such check valve may be repaired without disconnecting the pipe. The present construction affords numerous advantages, as will be apparent from a perusal of the foregoing specification.

In Fig. 3 I have illustrated a modified construction of the fitting 3, which is shown in Figs. 1 and 2. However, in this construction I have provided the bottom portion of the fitting 3 with an opening in which threads a cap or plug 43 having an opening 44 therein which cooperates with a bearing 45 oppositely disposed in the casing 3, adapted to receive therethrough a shaft or pin 46. This shaft 46 passes in fluid-tight manner through a packing 47 in the bearing 45 and on the outside the shaft is provided with an operating handle 48. Mounted upon the stem 46 is an eccentric cam 50 and the arrangement is such that by rotating the handle 48 180 degrees, it will in turn rotate the eccentric cam 50, whereby to engage the stem 17, causing the line valve 18 to be raised from its seat so that the liquid in the dispensing line above the drain valve may drain back into the tank.

In addition to the foregoing it will be seen that by placing the valve structure 14 directly over the inlet pipe 5 and directly in line with the removable cap 26, when the valve housing 14 is bodily removed from its seat in the internal partition 27, any type of measuring stick may be inserted directly downwardly through the inlet pipe 5 to determine the amount of liquid left in the underground tank.

What I claim is new is:

1. In a device of the class described, the combination of a valve housing having an inlet opening and a discharge opening adapted to engage pipes forming a dispensing line, said valve housing having an internal partition forming a main chamber and a drain chamber, a main valve port in said partition, connecting said main chamber with said drain chamber, a spring actuated check valve normally closing said main valve port to permit liquid to pass therethrough from the inlet opening to the discharge opening of said housing but not in a reverse direction, an auxiliary drain valve including a main valve body having a yieldable facing adapted to engage the auxiliary drain seat of said partition, a stem for actuating said valve toward and from its seat, said stem having a lost motion connection with said body, a spring normally urging said connection in one direction, said stem extending outside of said valve housing in liquid-tight manner, and means associated with that portion of the stem projecting outside of said housing for actuating said stem.

2. In a device of the class described, the combination of an enclosing housing having a horizontal partition forming an upper main chamber and a lower drain chamber, a main valve opening in said partition and a drain valve opening in said partition and disposed laterally of said first opening, a liquid inlet connecting with said drain chamber immediately below said liquid inlet and a liquid discharge connecting with said main chamber above said partition, a spring-pressed valve normally closing said main valve opening but yielding to permit flow of liquid to pass from the inlet side to the outlet side of said valve in said direction only, the top of said housing directly above and opposite said main valve having an opening of sufficient diameter to permit the removal of said spring pressed valve therethrough, a liquid-tight removable closure for said opening in said housing top, and a drain valve closing on said drain valve opening and having actuating means passing through the top of said housing in liquid-tight manner and operable from without said housing top to permit liquid in said housing above said main valve to drain from said main chamber into said drain chamber without disturbing said main valve.

3. In combination with a substantially boxlike housing having a top, bottom and side walls, and an internal substantially horizontal partition forming an upper main chamber and a lower drain chamber, said partition having a main, relatively larger opening, a liquid inlet for said housing below said partition, said partition opening being threaded, a valve dome threading into said opening and carrying a valve seat demountable from said partition by unscrewing said dome, guide means associated with said seat, a valve associated with said guide and adapted to close on said seat from above, spring means between said valve and dome, said top of said housing having an opening therein directly over and registering with said dome and valve seat whereby said dome and seat when dismantled may be removed directly through said opening, a cover for said housing top opening making liquid-tight contact therewith, said partition having a relatively smaller opening spaced laterally from said main valve opening, a drain valve seated on said smaller opening and having actuating means extending upwardly, said housing having a second opening directly over said drain valve actuator, and closure means forming liquid-tight connection with said opening, said actuator passing through said closure and operable from without said housing to open said drain valve without opening said main valve.

4. In a device of the class described, the combination of an enclosing housing having a horizontal partition forming an upper main chamber and a lower drain chamber, a relatively large valve opening at one end of said partition and a relatively smaller drain valve opening at the other end of said partition, a liquid inlet connecting with said drain chamber immediately below said main inlet and a liquid discharge connecting with said main chamber at the end adjacent said smaller valve opening, a spring-pressed main valve normally closing said larger valve opening but yielding to permit flow of liquid to pass from the inlet side to the outlet side of said valve in said direction only, the top of said housing directly above and opposite said main valve having an opening of larger diameter to permit the removal of said main valve therethrough, a liquid-tight removable closure for said opening, a smaller valve closing on said drain valve opening and having actuating means passing through the top of said housing in liquid-tight manner and operable from without said housing top to permit liquid in said housing above said main valve to drain from said main chamber into said drain chamber without disturbing said main valve, and means operable from outside said valve housing for draining liquid in said housing, and piping connecting with the main chamber on the discharge side of said check valve and piping on the inlet side of said check valve and connecting with the drain chamber and adapted to discharge to an underground tank.

FRANK B. EILERS.